United States Patent
Huchedé

(10) Patent No.: US 12,165,203 B1
(45) Date of Patent: Dec. 10, 2024

(54) DYNAMIC, EFFICIENT, AND CONTINUOUS GENERATION AND HANDLING OF CLIQUET COMBINATIONS

(71) Applicant: Cboe Exchange, Inc., Chicago, IL (US)

(72) Inventor: Florian Huchedé, Chicago, IL (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

(21) Appl. No.: 18/155,548

(22) Filed: Jan. 17, 2023

Related U.S. Application Data

(60) Provisional application No. 63/299,707, filed on Jan. 14, 2022.

(51) Int. Cl.
 *G06Q 40/04* (2012.01)
(52) U.S. Cl.
 CPC .................................. *G06Q 40/04* (2013.01)
(58) Field of Classification Search
 CPC ..................................................... G06Q 40/04
 USPC ..................................................... 705/35–45
 See application file for complete search history.

(56) References Cited

U.S. PATENT DOCUMENTS

| | | | |
|---|---|---|---|
| 2003/0110107 A1* | 6/2003 | Hiatt, Jr. ................ | G06Q 40/00 705/35 |
| 2004/0093301 A1* | 5/2004 | Fitzpatrick ............. | G06Q 40/00 705/37 |
| 2006/0036531 A1* | 2/2006 | Jackson ............... | G06Q 20/042 705/37 |
| 2011/0276456 A1* | 11/2011 | Tzroya .................. | G06Q 40/08 705/37 |
| 2012/0185372 A1* | 7/2012 | McIntosh ............... | G06Q 40/06 705/37 |
| 2014/0207641 A1* | 7/2014 | Chellaboina ........... | G06Q 40/04 705/37 |
| 2015/0254775 A1* | 9/2015 | Subramanian ......... | G06Q 40/06 705/36 R |
| 2017/0330279 A1* | 11/2017 | Ponzone ................ | G06Q 40/04 |

* cited by examiner

*Primary Examiner* — Robert R Niquette
(74) *Attorney, Agent, or Firm* — Fish & Richardson P.C.

(57) ABSTRACT

An exchange computer system configured to continuously, securely, dynamically, and efficiently generate cliquet combos includes a trading engine that receives related data from one or more remote user computing devices, determines various parameters for the cliquet combos from the received data, and generates the cliquet combos from those parameters. The trading engine then securely transmits data related to the generated cliquet combos to the one or more remote user computing devices via a computer network, each of those devices being configured to display that data within a graphical user interface. The same system is further configured to handle transactions involving generated cliquet combos, based on orders received from the devices.

20 Claims, 6 Drawing Sheets

DYNAMIC, EFFICIENT, AND CONTINUOUS GENERATION AND HANDLING OF CLIQUET COMBINATIONS

CROSS-REFERENCE TO RELATED APPLICATION

This application claims the benefit of U.S. Provisional Patent Application No. 63/299,707 filed Jan. 14, 2022, which is incorporated herein by reference in its entirety.

TECHNICAL FIELD

This application relates to technology for trading financial instruments in electronic exchanges, as well as hybrid exchanges that combine electronic and open-outcry trading mechanisms.

BACKGROUND

High volumes of financial instruments such as derivatives, stocks, and bonds are continuously traded at electronic exchanges, which enable trades to occur in real time through the algorithmic processing of orders and associated market information. Generally, a trade may be executed when the price associated with a bid to purchase a financial instrument matches the price associated with an offer to sell the same instrument. Market participants typically price their bids and offers based on market conditions, which are subject to rapid change, and electronic exchanges often match bids and offers based on price-time priority, and the principle of first-in, first-out (FIFO).

SUMMARY

In an electronic or hybrid exchange environment, many thousands of transactions are executed each second, and unforeseen events occur frequently. For that among other reasons, market participants can greatly benefit from enhanced control and flexibility over their orders. Sophisticated market participants in possession of specialized software and hardware can, for example, leverage market intelligence to inform decisions and build effective trading strategies involving complex order types made available by electronic exchanges. That said, not all participants enjoy the technological means and knowledge required to fully participate in the typically complicated process of forming financial instruments such as forward and options contracts.

The disclosed technology streamlines processes for generating, trading, and exercising complicated financial instruments, and levels the playing field among market participants by enabling cliquet combination ("combo") and options contracts to be generated, traded, and exercised through user-friendly graphical interfaces that can be implemented within a variety of networked user computer devices. In at least these ways, the disclosed technology enables market participants without access to specialized trading software and hardware to more fully participate in the trading of financial instruments. Further, and as explained in more detail below, the same technology that enhances fairness and flexibility in these ways reduces the bandwidth and computing resources required by an exchange and networked computer systems by, for example, vastly reducing the number of orders that ultimately need to be processed.

A cliquet combo ($C^2$) is a financial instrument representing a series of contracts that can be generated based on data received from one or more market participants in connection with a request to generate the cliquet combo. The data related to the request to generate the cliquet combo can include an identifier such as a ticker symbol for an underlying asset (e.g., a stock or option), in addition to a direction of increase or decrease in value of the underlying asset, timing information such as a range of dates in which the combo will be in force (e.g., including an expiry), and frequency information defining a number of times the combo will reset (each reset involving, e.g., the expiry of a constituent contract in a series of contracts, and the creation of a new contract in the same series). Any number of cliquet combos can be generated, and each cliquet combo provides an opportunity to trade a single financial instrument at a value representing a more complicated series of contracts. In some implementations, the cliquet combo represents a series of forward contracts. As an example, the series of forward contracts can include a series of forward-starting at-the-money forward contracts.

The disclosed technology for generating and handling cliquet combos enables market participants to more easily generate and execute complex trading strategies, with fewer orders relative to what would have been necessary had the same participants instead needed to have created the series of contracts represented by each combo, and correspondingly less demand on computing resources including processing and bandwidth for both the exchange computer system and networked user devices.

Further, cliquet combos are beneficial insofar as they enable market participants to partially insulate themselves from highly volatile market conditions. For example, volatility insensitive strategies enabled by cliquet combos provide robust protection against severe market crashes (e.g., high volatility in a stock market index resulting in major losses). A delta-one trading strategy enabled by cliquet combos can lower risks of major losses by accurately tracking prices at every reset period of the cliquet combo. When compared to a conventional delta-one strategy, the strike-dependent resets in the series of contracts of the cliquet combo provide opportunities for market participants to reduce spread between estimated value and actualized value of the underlying asset. Each contract in the series of contracts of the cliquet combo has a reset period to adjust the strike price based on a previous price from a previous reset period. The previous price can provide further accuracy for improve strike pricing of the cliquet combo by incorporating adjustments to a price of an underlying asset, such as including dividends, interest rates, capital gains, and other returns.

The disclosed technology provides additional advantages by enabling market participants to execute complex trading strategies using fewer orders. For example, a cliquet combo can be generated to replicate the performance a stock market index (e.g., Standard and Poor's 500) using a series of contracts resetting at a specified frequency. Due to the strike-price dependency of the series of contracts, the cliquet combo provides that a spot curve, e.g., a spot rate, and a forward curve, e.g., a forward rate, trade together for an underlying asset of the cliquet combo. In conventional trading strategies, providing a forward rate and a spot rate that trade together may typically occur when trading over-the-counter, e.g., derivatives that can be higher risk due to less regulation requirements in brokerage networks compared to centralized exchanges.

Cliquet combos can also be offered for any asset class on a market exchange that utilizes a simple order book, due to the reduced complexity offered by cliquet combos relative to financial instruments typically used in straddle or spread strategies. Each forward contract in the series of forward contracts meets simple order book requirements, e.g., fewer than two legs in each forward contract of the series. By meeting simple order book requirements, cliquet combos can enable market participants to engage directly with centralized and highly regulated exchanges in implementing complex trading strategies, rather than having to rely on third parties. This in turn introduces further computational efficiencies by limiting the number of systems involved in any given transaction or series of transactions.

As described in more detail within the following disclosure, an exchange computer system can be implemented in a manner enabling it to dynamically, efficiently, and continuously generate and trade cliquet combos based on inputs received from networked users. Advantageously, the exchange computer system enables users/market participants to generate and trade cliquet combos based on simple inputs provided through user-friendly graphical user interfaces of their respective devices.

Further, the generated cliquet combos ultimately reduce the bandwidth and computing resources required by the exchange and networked computer systems by, for example, reducing the number of orders that ultimately need to be processed in connection with strategies that can be more elegantly executed with forward contracts. For example, by facilitating the generation and trading of cliquet combos, the exchange prevents the need for additional transactions of underlying financial assets that might otherwise have taken place, with associated consumption of computing resources.

As another example, the exchange can be configured to enable cliquet combos to be generated based on a frequency, e.g., a number of reset periods to occur within the cliquet combo. In contrast to the term for standard forwards, the cliquet combo includes a series of contracts throughout the term for the cliquet combo. Each contract in the series of contracts can provide an interpolation of a forward curve for an underlying asset of the cliquet combo. The forward curve can represent a price of a forward contract with respect to the time to maturity, e.g., expiry, of the forward contract, based on data related to the underlying asset. A generated cliquet combo for an underlying asset can include the total return when determining strike prices for each of the forward contracts, thereby effectively modeling the forward curve. By providing effective modeling of the forward curve, the generated cliquet combo offers an additional advantage of reducing dividend risk.

In derivative trading strategies, e.g., using options, forward contracts, which hold a short position, dividend risk can include owing dividend payments, e.g., additional costs, for the derivatives in an executed contract. In derivative trading strategies that hold a long position, dividend risk can include lower than expected returns if the shares of the underlying asset are called away in a terminated contract, e.g., the owner of the terminated contract no longer receives an expected dividend return. Many trading strategies used by market participants are prone to dividend risk, thereby compounding additional losses or reducing potential profits during highly volatile market conditions.

Cliquet combos can effectively model forward prices, by including dividends, interest rates, and other factors in strike-prices for each contract in the series of contracts. Each shorter-term contract, e.g., a contract in the series of contracts, includes a strike price and premium accounting for dividends. Frequency-based reset periods in the cliquet combo provides multiple shorter-term contracts, e.g., interpolation of the forward curve, and thereby removes dividend risk in the generated cliquet combo. Additionally, the strike price dependency for each contract in the series of contracts provide reduced leg risk, e.g., unfavorable conditions for trading the contract, compared to conventional options-based strategies. For example, a change in implied volatility for an asset can a leg of an option unfavorable, e.g., less likely to be fulfilled, throughout the duration of the option leg. A cliquet combo does not introduce leg risk, as each contract in the series of contracts will be fulfilled due to strike-price dependencies. The cliquet combo provides multi-faceted trading strategies on exchange computer systems, enabling market participants can generate and trade cliquet combos alongside with other option strategies such as delta-hedging, dividend trading, and implied volatility trading.

The disclosed technology provides market participants the opportunity to execute complex trading strategies while reducing dividend risk, e.g., providing further protections to reduce losses and maximize returns. For example, a complex trading strategy may include exposure to underlying asset volatility and returns without actual ownership of a financial instrument for the underlying asset. Short-term strategies such as repurchase agreement (repo) trading are prone to dividend risk, as repo trading includes market participants executing trades to sell securities, e.g., collateralized by a Treasury. A repo strategy typically requires a market participant to re-purchase the previously sold securities-providing a low-risk opportunity for market participants to improve short-term liquidity. With improved liquidity, market participants can reduce risk and have increased participation across exchanges. While the short duration of repo trading provides additional yield, flexibility, and liquidity for market participants, dividends can add significant costs and increase risk for an otherwise low-risk trading strategy. Cliquet combos enable exchange computer systems to provide a financial instrument, e.g., a series of forward contracts, which truly enable the low-risk benefits of repo trading strategies by removing dividend risk.

By providing improved liquidity for market participants, the disclosed technology enables market participants to meet portfolio margin requirements, e.g., maintaining a minimum deposit amount based on the risk of the market participant. Cliquet combos enable exchange computer systems to realize profits and losses at the end of each contract in the series of contracts, compared only at the expiry of the forward contract in conventional trading strategies. By enabling higher liquidity throughout the duration of the cliquet combo, market participants can maintain portfolio margining requirements and pursue additional options-based trading strategies. A cliquet combo itself can serve as a collateral for market participants to fulfill obligations in options-based strategies, thereby reducing risk of default. Cliquet combos can reduce complexity and risk associated with high-risk trading strategies and mitigate the potential opportunity of market crashes, and the losses associated with market crashes.

The disclosed technology can also provide advantages in exchange computer systems that offer exchange traded funds (ETFs). For example, cliquet combos provide improved leverage compared to ETFs because cliquet combos offer a series of contracts, e.g., derivatives, to achieve improved returns through exposure of the underlying asset without necessarily owning the underlying asset. Cliquet combos also provide improved capital market efficiency compared to ETFs, as the strike price for each contract is adjusted when the cliquet combo resets, e.g., the expiry of a first contract leads to an activation of a second contract. The strike price of each contract can be based on adjusted spot price of the asset from a previous reset period, thereby enabling accurate price tracking of the asset. Furthermore, since a cliquet combo can be performed with fewer transactions, the cliquet combo can be offered without management fees, e.g., no fee drag, compared to an ETF that require management fees, e.g., reducing possible returns for the market participant.

The disclosed technology can also provide advantages in exchange computer systems that offer futures contracts ("futures".) Cliquet combos can often have lower rolling costs compared to futures, because rolling costs are based on the change in the futures price and the change in the spot price for an underlying asset. Since cliquet combos incorporate spot pricing for the strike price of each contract in the series of contracts, any associated fees for rolling one contract to the next are significantly lower compared to futures, e.g., futures pricing do not typically account for spot prices of the asset. Furthermore, cliquet combos offer an over-the-counter forward basis and over-the-counter options basis as an alternative to futures. For example, the series of contracts in the cliquet combo can be made up of forward contracts that determine a strike price of the forward contracts based on the spot price of the underlying asset. Similarly, the series of contracts in the cliquet combo can be made up of options that determine a strike price of the options based on the spot price of the underlying asset. By offering a basis, e.g., dependency on spot price, for forwards and options to be used in a cliquet combo, the disclosed technology provides flexible trading strategies with lower risk in an exchange computer system that were previously unavailable to market participants.

The disclosed technology can also provide advantages compared to traditional options-based trading that require complex strategies, such as a straddle strategy. Complex straddle strategies for options-based trading involve, for example, the purchase of a put and a call option with the same expiration date and strike price for the same financial instrument. The series of forward contracts in a cliquet combos can use adjusted strike pricing to provide similar exposure to straddle strategies using options but with fewer transactions. As such, beyond their other benefits, cliquet combos reduce the overall number of transactions required to implement complex strategies, with related reduction in use of computing resources.

In these and other ways, the disclosed technology reduces consumption of computing resources while at the same time enabling users to more precisely manage their risks through user-friendly interfaces. For example, the disclosed exchange computer system may be configured to automatically generate a cliquet combo in response to answers to interrogatories provided through a graphical user interface of an application running on a networked PC or smartphone, and can be further configured to trade cliquet combos based on inputs received through the same application.

As described in more detail within this disclosure, an exchange computer system can be implemented in a manner allowing it to continuously, efficiently, and securely facilitate the generation and trading of cliquet combos.

In an aspect, an exchange computer system configured to continuously, securely, dynamically, and efficiently generate cliquet combos may include at least one communication interface that is configured to receive, from one or more remote computing devices connected to the exchange computer system via a computer network, data related to one or more financial instruments. The exchange computer system may further include at least one non-transitory computer-readable medium configured to store the data related to the one or more financial instruments, and a trading engine with at least one hardware processor coupled with the at least one non-transitory computer-readable medium.

The at least one non-transitory computer-readable medium may be further configured to store computer-executable instructions that when executed by the at least one hardware processor, cause the trading engine to perform several processes that may include receiving, from a remote user computing device, data related to a request to generate a cliquet combo that includes a series of contracts. The remote user computing device may be configured to display data related to the cliquet combo within a graphical user interface of an application that facilitates continuous real-time trading, through the exchange computer system, of financial instruments including cliquet combos. The remote user computing device may be further configured to receive, through the graphical user interface, one or more user inputs that determine the data related to the request to generate the cliquet combo.

The trading engine processes may also include determining, based on the data related to the request to generate the cliquet combo, a number of reset periods for the series of contracts and an expiry date for the cliquet combo. The trading engine processes may also include determining, based on the number of reset periods for the series of contracts and the expiry date for the cliquet combo, an expiry date for each contract in the series of contracts. The trading engine processes may also include determining, based on the expiry date for the cliquet combo and the data related to the one or more financial instruments, a premium price for the cliquet combo.

The trading engine processes may include generating the cliquet combo and securely transmitting data related to the generated cliquet combo to the remote user computing device. The remote user device is connected to the exchange computer system via the computer network and is configured to display the data related to the generated cliquet combo within the graphical user interface.

The exchange computer system may include the cliquet combo, in which a second contract in the series of contracts becomes active when a first contract in the series of contracts expires. An expiry date of a final contract in the series of contracts is the expiry date of the cliquet combo. In some implementations, the series of contracts includes a series of forward-starting at-the-money forward contracts.

The exchange computer system may further the at least one non-transitory computer-readable medium that is further configured to store additional computer-executable instructions that when executed by the at least one hardware processor, cause the trading engine to perform additional processes. The additional processes may include determining an at-the-money strike price for each contract in the series of contracts at the corresponding expiry date, based on the data related to the one or more financial instruments.

The exchange computer system may further include the at least one non-transitory computer-readable medium that is further configured to store additional computer-executable instructions that when executed by the at least one hardware processor, cause the trading engine to perform additional processes. The additional processes may include determining an at-the-money strike price for a second contract in the series of contracts at the expiry date of a first contract in the series of contracts, based on the data related to the one or more financial instruments. The one or more financial instruments may include one or more stocks traded on a stock exchange, and the data related to the one or more financial instruments include a price for each of the one or more stocks. The one or more financial instruments may include one or more options traded on an options exchange, and the data related to the one or more financial instruments includes a price for each of the one or more options.

The exchange computer system may further include the at least one non-transitory computer-readable medium that is further configured to store additional computer-executable instructions that when executed by the at least one hardware processor, cause the trading engine to perform additional processes. The additional process may include adjusting the premium price for the cliquet combo at the expiry date of each contract in the series of contracts, based on the data related to the one or more financial instruments.

The exchange computer system may further include the at least one non-transitory computer-readable medium that is further configured to store additional computer-executable instructions that when executed by the at least one hardware processor, cause the trading engine to perform additional processes. The additional processes may include adjusting the premium price for the cliquet combo at the expiry date of the second contract in the series of contracts, based on the data related to the one or more financial instruments. In some implementations, the additional processes may include adjusting the premium price for the cliquet combo at the expiry date of the second contract in the series of contracts further includes adjusting the premium price for the cliquet combo based on interest rate data.

The exchange computer system may include that the data related to the generated cliquet option that is displayed within the graphical user interface includes the premium price for the cliquet combo, the expiry date for the cliquet combo, and the expiry date for each contract in the series of contracts.

In some implementations, the exchange computer system may include the at least one non-transitory computer-readable medium that is further configured to store additional computer-executable instructions that when executed by the at least one hardware processor, cause the trading engine to perform additional processes. The additional processes may include receiving from the remote user computing device, data related to a first order for a first cliquet combo. The remote user computing device is configured to display data related to the first cliquet combo within the graphical user interface. The remote user computing device may also be further configured to receive, through the graphical user interface, one or more user inputs that determine the data related to the first order for the first cliquet combo. The additional processes may include receiving, from a second remote user computing device, data related to a second order and automatically determining, based on the data related to the first order for the first cliquet combo and the data related to the second order, that the first order for the first cliquet combo and the second order match. The additional processes may include that responsive to automatically determining that the first order for the first cliquet combo and the second order match, facilitating a transaction. The additional processes may include that responsive to facilitating the transaction, sending data to the remote user computing device that causes the graphical user interface to indicate that a transaction has been completed.

In some implementations, the exchange computer system is a distributed computer system that includes the at least one communication interface, the at least one non-transitory computer-readable medium, the trading engine, an order entry port, and an order routing system. The order entry port may be configured to receive the data related to the first order for the first cliquet combo and the data related to the second order. In some implementations, the first cliquet combo is the generated cliquet combo.

In another aspect, an exchange computer system configured to continuously, securely, dynamically, and efficiently generate cliquet options may include at least one communication interface that is configured to receive, from one or more remote computing devices connected to the exchange computer system via a computer network, data related to one or more financial instruments. The exchange computer system may include at least one non-transitory computer-readable medium configured to store the data related to the one or more financial instruments. The exchange computer can also include a trading engine that includes at least one hardware processor coupled with the at least one non-transitory computer-readable medium. The at least one non-transitory computer-readable medium is further configured to store computer-executable instructions that when executed by the at least one hardware processor, cause the trading engine to perform several processes.

These processes may include receiving, from a remote user computing device, data related to a request to generate a cliquet option that includes a series of options. The remote user computing device may be configured to display data related to the cliquet option within a graphical user interface of an application that facilitates continuous real-time trading, through the exchange computer system, of financial instruments including cliquet options. The remote user computing device may be further configured to receive, through the graphical user interface, one or more user inputs that determine the data related to the request to generate the cliquet option.

The trading engine processes may include determining, based on the data related to the request to generate the cliquet option, a number of reset periods for the series of options and an expiry date for the cliquet option. The processes may include determining, based on the number of reset periods for the series of options and the expiry date for the cliquet option, an expiry date for each option in the series of options. The processes may also include determining, based on the expiry date for the cliquet option and the data related to the one or more financial instruments, a premium price for the cliquet option. In some implementations, the series of options includes a series of forward-starting at-the-money options.

The trading engine processes may generating the cliquet option and securely transmitting data related to the generated cliquet option to the remote user computing device. The remote user device may be connected to the exchange computer system via the computer network and is configured to display the data related to the generated cliquet option within the graphical user interface.

The exchange computer system may also include the at least one non-transitory computer-readable medium that is further configured to store additional computer-executable instructions that when executed by the at least one hardware processor, cause the trading engine to perform additional processes. The additional processes may include receiving, at the least one communication interface, from the remote user computing device, data related to a request to exercise the generated cliquet option. The remote user computing device may be further configured to receive, through the graphical user interface, one or more additional user inputs that determine the data related to the request to exercise the generated cliquet option. The additional processes may also include, responsive to receiving the data related to the request to exercise the generated cliquet option at the at least one communication interface, determining by the at least one hardware processor, based on the data related to the generated cliquet option, that the option is exercisable. The additional processes may include, responsive to determining by the at least one hardware processor that the generated cliquet option is exercisable, facilitating the request to exercise the generated cliquet option. The additional processes can include, responsive to facilitating the request to exercise the generated cliquet option, sending data to the first remote user computing device that causes the graphical user interface to indicate that the generated cliquet option has been exercised.

In some implementations, the exchange computer system may include the at least one non-transitory computer-readable medium that is further configured to store additional computer-executable instructions that when executed by the at least one hardware processor, cause the trading engine to perform additional processes. The additional processes may include receiving from the remote user computing device, data related to a first order for a first cliquet option. The remote user computing device may be configured to display data related to the first cliquet option within the graphical user interface, The remote user computing device may be further configured to receive, through the graphical user interface, one or more user inputs that determine the data related to the first order for the first cliquet option.

The additional processes may include receiving, from a second remote user computing device, data related to a second order and automatically determining, based on the data related to the first order for the first cliquet option and the data related to the second order, that the first order for the first cliquet option and the second order match. In some implementations, the additional processes may include responsive to automatically determining that the first order for the first cliquet option and the second order match, facilitating a transaction. The additional processes may include responsive to facilitating the transaction, sending data to the remote user computing device that causes the graphical user interface to indicate that a transaction has been completed.

The details of one or more embodiments of the subject matter described in this specification are set forth in the accompanying drawings and the description below. Other potential aspects, features, and advantages will be apparent from the description, the drawings, and the claims.

DETAILED DESCRIPTION

Figure 1:
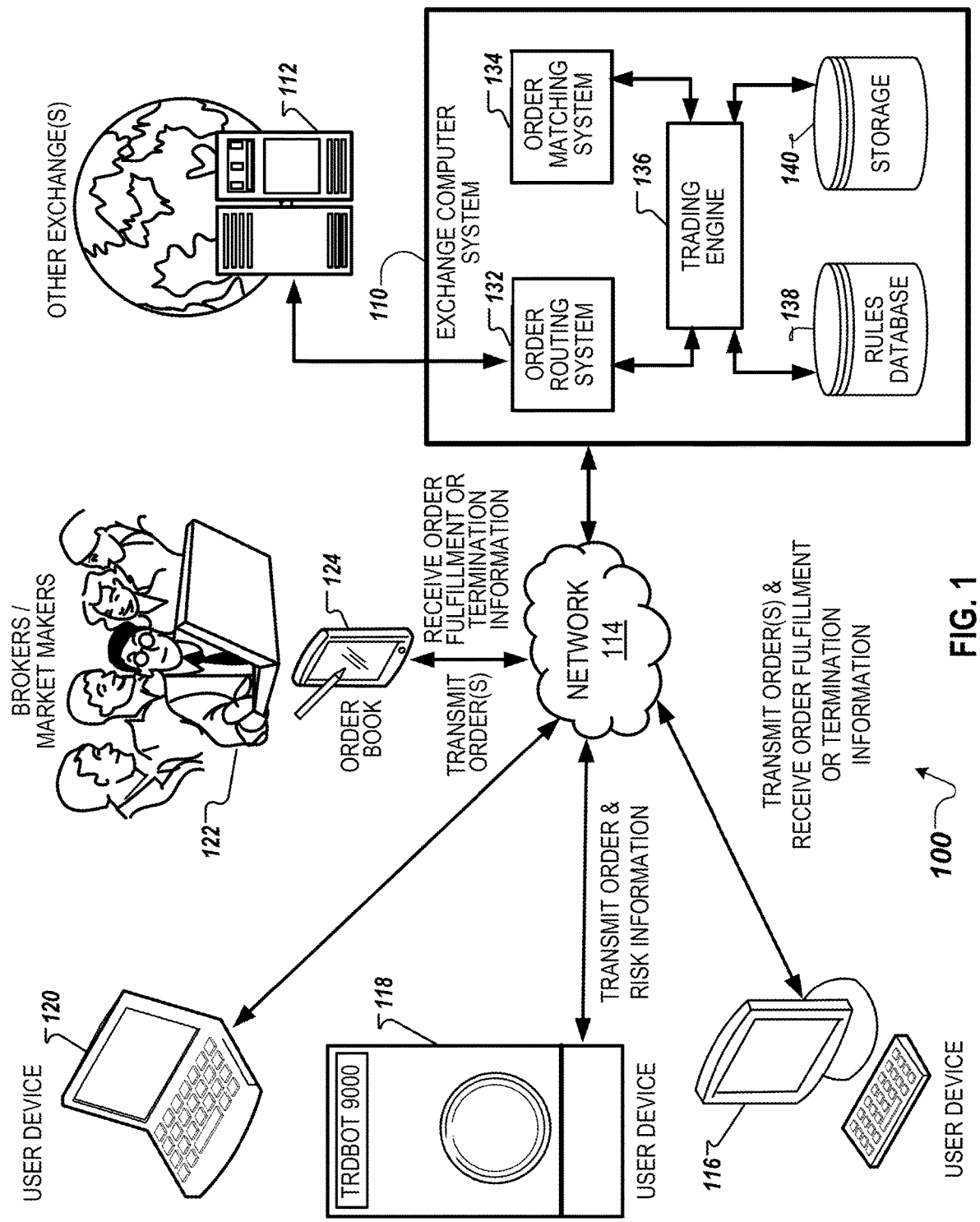
FIG. 1 is an example diagram of an exchange computer system and associated networks, devices, and users.

FIG. 1 is a diagram of an exemplary trading environment 100 for generating a cliquet combo that includes an exchange computer system and the associated networks, devices, and users. Generally, the term "user" may refer to any entity that interacts with the exchange computer system and/or associated networks and devices. Users may include, for example, market makers and other market professionals, brokers, institutional traders, individual traders, and automated trading systems. The diagram may include an exchange computer system 110, other exchanges 112, a network 114, user devices 116, 118, 120, market makers/brokers 122, and electronic order book 124.

The exchange computer system 110 may be implemented in a fully electronic manner, or in a hybrid manner that combines electronic trading with aspects of traditional open-outcry systems. The exchange computer system 110 may receive orders for trading financial instruments locally on the floor and from remote electronic devices. The financial instruments may include securities such as stocks, options, futures contracts, or other derivatives associated with an underlying asset.

Network 114 connects the various components within the trading environment, and may be configured to facilitate communications between those components. Network 114 may, for example, be configured to enable the exchange of electronic communications that include order and order fulfillment information between connected devices, such as an electronic order book 124 and the exchange computer system 110.

Network 114 may include one or more networks or subnetworks, each of which may include a wired or wireless data pathway. Network 114 may, for example, include one or more of the Internet, Wide Area Networks (WANs), Local Area Networks (LANs), or other packet-switched or circuit-switched data networks that are capable of carrying electronic communications (e.g., data or voice communications).

To protect communications between the various systems, devices, and components connected to network 114, network 114 may implement security protocols and measures such that data identifying order or bid information, or parties placing orders or quotes, may be securely transmitted. Network 114 may, for example, include virtual private networks (VPNs) or other networks that enable secure connections to be established with exchange computer system 110.

User devices 116, 118, and 120 may include portable or stationary electronic devices, such as smartphones, laptops, desktops, and servers that include user interfaces to display information and receive user input, and that are configured to communicate over a computer network. User devices 116, 118, and 120 may communicate with the exchange computer system 110 over network 114 using a proprietary protocol, or a message-based protocol such as financial information exchange (FIX), implemented over TCP/IP.

User devices 116, 118, and 120 may transmit user input such as order information or risk information to the exchange computer system 110, and may also receive data from the exchange computer system 110 indicating that an order has been filled or canceled.

Users such as brokers/market makers 122 may also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, a trading engine 136, a database of trading rules and algorithms 138, and storage 140. In some implementations, the exchange computer system 110 is a distributed computer system.

The order routing system (ORS) 132 determines whether a received order or quote is to be executed at the exchange computer system 110, or should instead be redirected to another exchange 112, and may include processing systems that enable the management of high data volumes. The ORS 132 may, for example, receive order or quote information for the purchase or sale of financial instruments from one or more user devices 116, 118, 120, and 124. In some implementations, the ORS 132 may also be connected to or include a touch-screen order routing and execution system accessible by brokers on the exchange floor, such as a public automated routing (PAR) system.

Upon receiving an order or quote, the ORS 132 determines if the destination specified in the received order or quote is the exchange computer system 110. If the exchange computer system 110 is not the destination, the ORS 132 forwards the order or quote to another exchange 112, which may be either the destination exchange, or an exchange en route to the destination exchange. If the ORS 132 determines that the exchange computer system 110 is the destination of the received order or quote, the ORS 132 may forward the received order or quote to the order matching system 134.

The order matching system (OMS) 134 may include processing systems that analyze and manipulate orders according to matching rules stored in the database 138. The OMS 134 may also include an electronic book (EBOOK) of orders and quotes with which incoming orders to buy or sell are matched, according to the matching rules. The EBOOK may also be implemented in a separate database such as storage 140, which may include multiple mass storage memory devices for the storage of order and quote information. When the OMS 134 determines that a match exists for an order (for example, when a bid matches an offer for sale), the order matching system 134 may mark the matched order or quote with a broker-specific identifier so that the broker sending the order or quote information can be identified.

The trading engine 136 may be implemented using a combination of software and hardware. The trading engine 136 may, for example, be implemented as one or more hardware processors configured to execute one or more algorithms, as described in further detail below. An example configuration of an exchange computer system featuring a trading engine 136 is further described in FIG. 2.

The trading engine 136 may generate cliquet combos based on information received from one or more networked user devices. The trading engine 136 may generate the cliquet combos by following processes further described, for example, with respect to FIGS. 3, 4, and 5. After generating the cliquet combos, the trading engine 136 may notify other exchanges (e.g., exchanges 112) and one or more user devices (e.g., user devices 116, 118, 120) of generation of the cliquet combos using network 114. As noted above, the generation and trading of cliquet combos significantly reduces the bandwidth and computing resources required by both the exchange computer system 110 and networked computer systems (e.g., user devices 116, 118, and 120) in each of several ways.

For example, as a component of exchange computer system 110, trading engine 136 is well suited to the role of a centralized and authoritative creator of cliquet combos, at least insofar as it is able to efficiently generate the cliquet combos using data to which exchange computer system 110 already has access. In contrast, and absent the service provided by trading engine 136, other systems (e.g., user devices 116, 118, and 120) would need to redundantly devote significant bandwidth to monitoring this data.

As another example, trading engine 136 vastly reduces the number of orders that need to be sent, received, and processed in connection with strategies leveraging the information captured and represented by the cliquet combos. More specifically, trading engine 136 enables connected devices to practically leverage cliquet combos in a manner that minimizes the number of orders involved in implementing and fulfilling complex strategies that would otherwise require trading of a variety of forward contracts, with relatedly higher computational expenditure. For example, connected devices may request an order to generate a cliquet combo from the trading engine 136 and receive a series of highly specialized, complex, and customized contracts. Without a trading engine 136 configured to generate cliquet combos, a similar series of contracts, e.g., forwards, would require a significant number of critically timed orders, thereby increasing traffic to an exchange computer system 110.

Additionally, the practical application of cliquet combos enables fulfillment of these complex strategies with significantly less network traffic than would otherwise be necessary, at least by virtue of the reduced numbers of orders involved. In at least these ways, the generation of cliquet combos, and the processing of orders involving cliquet combos, dramatically improves the computational efficiency with which complex strategies can be implemented and fulfilled. The cliquet combo also enables trading strategies that leverage freely rolling of contracts, e.g., closing one contract and opening another contract for the same underlying asset. By freely rolling the series of contracts, a complex trading strategy can be accurate timed, scheduled, and executed without further input from a connected user device using the generated cliquet combo.

For instance, and as noted above, the exchange computer system 110 could facilitate and fulfill large numbers of transactions for connected users implementing strategies traditionally involving straddling, at a significant cost in bandwidth and processing resources. But the exchange computer system 110 can alternatively facilitate implementation of similarly complex strategies based on cliquet combos with far fewer transactions (and correspondingly less bandwidth and resource expenditure for all systems involved).

The exchange computer system 110 can also facilitate and fulfill large numbers of transactions for connected users implementing delta-one strategies, e.g., conventionally achieved by performing forward swaps, to replicate performance of an underlying asset, e.g., a stock market index. By generating a cliquet combo, a series of contracts for an underlying asset, e.g., Standard and Poor's 500 stock market index, with at-the-money strike prices can be provided to the connected users. The series of contracts of the generated cliquet combo replicate, e.g., by tracking, a price return performance of the underlying asset that includes a total return, e.g., includes dividend, interest, capital gains, and other returns.

The exchange computer system 110 may also facilitate an order for a cliquet combo. For example, the exchange computer system 110 may be configured to receive data from one or more user devices (e.g., user devices 116, 118, and 120) by the network 114 connected to the exchange computer system 110. The received data describes a request to enter the order for the cliquet combos in the electronic order book 124. The exchange computer system 110 facilitates the transaction by determining a second order in the electronic order book 124 matches the order described in the received data. The exchange computer system 110 may utilize the ORS 132 to route the order from the received data and the OMS 134 to match the second order in the electronic order book 124 to the order.

The exchange computer system 110 may also be configured to simultaneously receive (e.g., by the network 114 and ORS 132 of the exchange computer system 110) from one or more user devices, multiple orders for cliquet combos. The exchange computer system 110 receives a third order while the second order in the electronic order book 124 matches the order from the received data.

The electronic order book 124 may be a trade at settlement order book and the determined transaction price of the order from the received data is based on a daily settlement price of the generated cliquet combo. A user, for example, may place an order for a cliquet combo through a trade at settlement transaction during the trading day, at a price equal to the cliquet combo's settlement price. In some implementations, the order for the cliquet combo can be placed a specified price differential above or below the daily settlement price. Completed trade at settlement orders for the cliquet combo are confirmed during the trading session, and the final price for the transaction of the cliquet combo is confirmed when the daily settlement price is established.

In some implementations, the electronic order book 124 may be a mark-to-model order book and the determined transaction price of the order from the received data is based on a daily settlement price determined by one or more financial models. For example, the daily settlement price may be provided by a financial model when a market for the underlying asset is not available, e.g., for complex financial instruments. In some implementations, the daily settlement price may be determined from a non-total return forward curve with a known expected dividend return.

The order from the received data may be a market order. In some implementations, other types of derivative contracts (e.g., forwards, swaps, and options) may be traded based on a cliquet combo. In some implementations, a user may receive settlement of a cliquet combo by transferring the underlying asset to the user. In other implementations, the user may receive a cash-value settlement for the cliquet combo.

In some implementations, the exchange computer system 110 is a distributed computer system that includes an order entry port (e.g., by network 114), an order routing system (e.g., ORS 132), an order matching system (e.g., OMS 134), and a trading engine (e.g., trading engine 136). The distributed computer system may operate multiple hardware and software processes in parallel configurations. The order entry port receives the order from the data sent to the exchange computer system by a user device and the order routing system is configure to route the order to a destination associated with the order. As an example, the destination may include other exchanges 112, based on matching rules stored on database 138 and the configuration of the order matching system to match the order to the destination in the other exchanges 112.

Storage 140 and database 138 store and handle data in a manner that satisfies the privacy and security requirements of the exchange computer system 110 and its users, and may store one or more of telemetric data, user profiles, user history, and rules and algorithms for matching quotes, bids, and orders.

Upon completion of a trade (through the floor in open outcry as entered into the PAR system, or through automatic execution through the OMS 134 and auction engine 136), the fill information is passed through the OMS 134 and the ORS 132 to one or more user devices 116, 118, 120, and 124, and to the trading engine 136. The trading engine 136 matches the buy side and sell side of a trade, and forwards the matched trade to a third party organization that verifies the proper clearance of the trade, such as the Options Clearing Corporation (OCC) where the securities may be options, or Depository Trust Company (DTC) where the securities may be equities. The OMS 134 also formats the quote and sale update information and sends that information through an internal distribution system that refreshes display screens on the floor, in addition to submitting the information to a quote and trade dissemination service such as, in the case of options, the Options Price Reporting Authority (OPRA). In the case of Equities, the information would be submitted to the Securities Information Processor (SIP).

Figure 2:
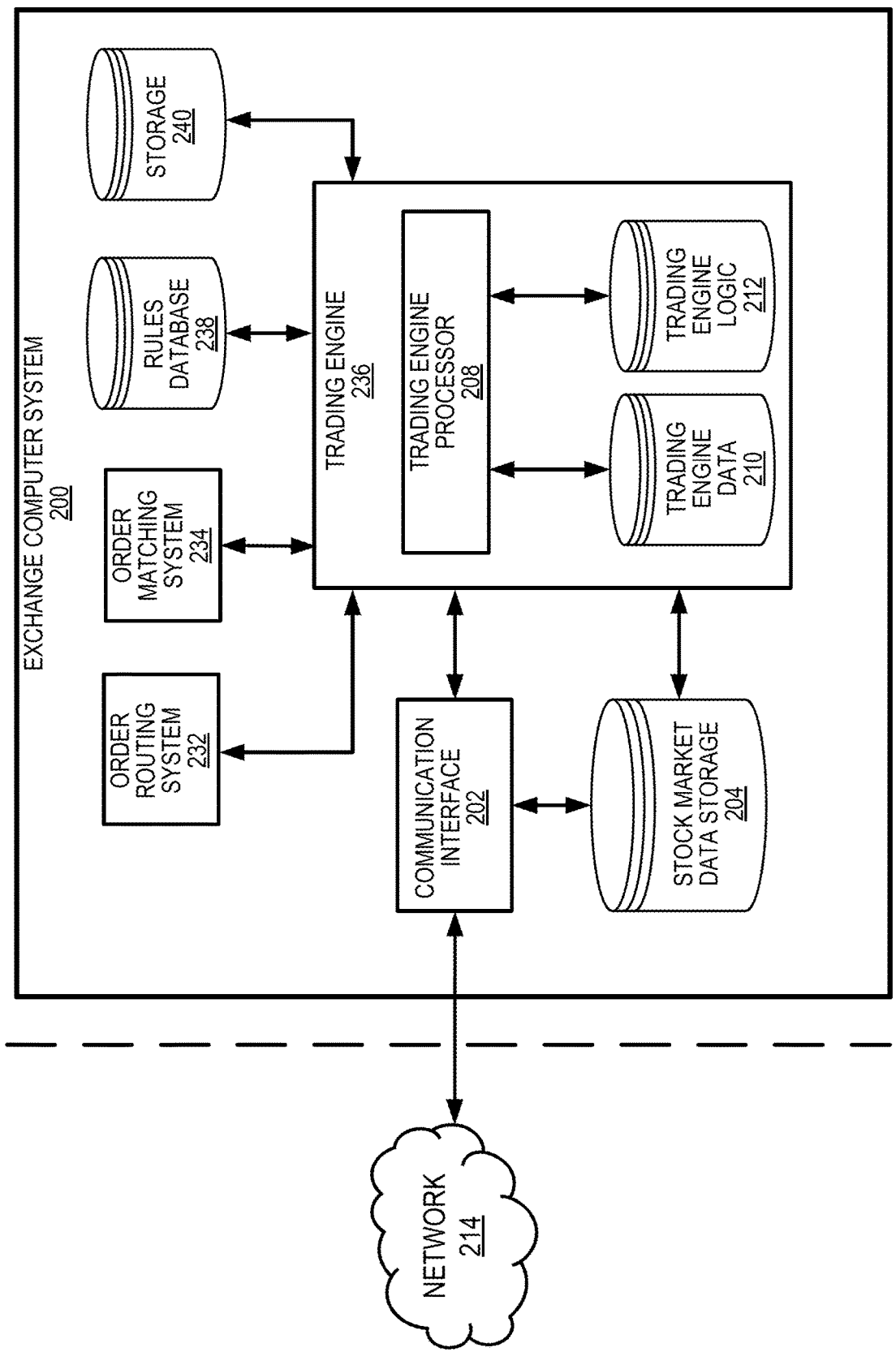
FIG. 2 is an example diagram of an exchange computer system including a trading engine.

FIG. 2 is a diagram of an example exchange computer system 200 with a trading engine 236 configured to generate, trade, and settle cliquet combos. The exchange computer system 200 may be implemented by software, hardware, or some combination as described herein. As an example, the exchange computer system 200 may be implemented as a server, a computer, or other device or processing component using proprietary software designed and implemented to achieve the functionality described herein. The exchange computer system 200 may be distributed or subdivided between a plurality of entities e.g., multiple computing devices.

The exchange computer system 200 may include a communication interface 202, coupled with a stock market data storage 204. The communication interface 202 may be communicatively linked to a trading engine 236, which includes a trading engine processor 208, trading engine data 210, and trading engine logic 212. The trading engine 236 may also be communicatively linked to an ordering matching system 234, an order routing system 232, a rules database 238, and storage 240 of the exchange computer system 200. The communication links in the exchange computer system 200 may be established by a system bus, network, or one or more other connection mechanisms. As an example, the connection mechanisms may include a wired connection, a wireless connection, or a combination thereof. For example, the connection may be a physical connection, such as a wired Ethernet connection. In another example, the connection may be a wireless connection, such as a cellular telephone network, an 802.11, 802.16, 802.20 controls or components, a WiMax network, or any other type of network. Further, network 214 may be a public network, such as the Internet, a private network, such as an intranet, or combinations thereof, and may utilize a variety of networking protocols now available or later developed including, but not limited to TCP/IP based networking protocols.

The trading engine processor 208 may include one or more processors, such as general-purpose processors (e.g., a microprocessor), special-purpose processors (e.g., an application-specific integrated circuit (ASIC) or digital-signal processor (DSP), programmable-logic devices (e.g., a field programmable gate array (FPGA)), or any other processor components now known or later developed. The trading engine processor 208 may carry out one or more instructions using one or more arithmetic, logical, and/or input/output operations. Though trading engine processor 208 is illustrated as a single component, trading engine processor 208 may be integrated in whole or in part with other components of the exchange computer system 200.

Data storage e.g., stock market data storage 204 and trading engine data 210, may be a main memory, a static memory, or a dynamic memory. Stock market data storage 204 and storage for trading engine data 210 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, organic storage components, and the like. As an example, the stock market data storage 204 and storage for trading engine data 210 may include a cache or random access memory for the trading engine processor 208. Stock market data storage 204 and storage for trading engine data 210 may be separate from the trading engine processor 208, such as a cache memory of a processor, the system memory, or other memory. Stock market data storage 204 and storage for trading engine data 210 may be an external storage device or database for storing data. Examples may include a hard drive, compact disc ("CD"), digital video disc ("DVD"), memory card, memory stick, universal serial bus ("USB") memory device, or any other device operative to store data.

As further shown, the trading engine 236 may include trading engine data 210 and/or trading engine logic 212. The trading engine data 210 may include one or more types of data suitable for a given implementation. For example, trading engine data 210 may include data (such as input datasets) that may be stored in memory. Trading engine logic 212 may include, for example, machine language instructions executable by trading engine 236 to carry out various functions, such as the functionality of the methods and systems described herein. In some implementations, the functions, acts or tasks may be independent of the particular type of instructions sets, storage media, processor or processing strategy and may be performed by software, hardware, integrated circuits, firm-ware, micro-code and the like, operating alone or in combination. Processing strategies may include multiprocessing, multitasking, parallel processing and the like.

In the exchange computer system 200, the communication interface 202 may include one or more structures, and associated equipment, for receiving data from one or more sources and distributing data to a group of one or more destinations. In some implementations, the communication interface 202 may include one or more additional communication interfaces and can operate in different configurations (e.g., distributed system, parallel). The communication interface 202 may be configured to receive input datasets from one or more entities (e.g., user devices or other exchanges) and store all or part of the input datasets in stock market data storage 204. The communication interface 202 may also be configured to communicate all or part of the input datasets to the trading engine 236 once the input datasets are stored or otherwise processed. The communication interface 202 may include a transceiver having one or more input/output ports connected to the network 214 to securely transmit data for one or more cliquet combos from the trading engine 236 to user computing devices.

As an example, the input datasets are stored in market data storage 204 may be partitioned (e.g., horizontal, vertical, functional) into designated memory locations (e.g., virtual addresses) based on qualities of the input datasets, e.g., a type of cliquet, and a type of underlying asset. In some implementations, input datasets with data related to component stock options may be stored in market data storage 204 and include a linking identifier (e.g., address, memory mapping) to identify a corresponding stock for each of the component stock options. In some implementations, the market data storage 204 may be configured to receive an indicator describing the operating status (e.g., receiving, clearing, storing) of input datasets of the communication interface 202.

The input datasets from the communication interface 202 may include financial market data (e.g., market intelligence) corresponding to the underlying asset corresponding to the cliquet combo. For example, financial market data may include volatilities, interest rates, dividends, returns (e.g., historical, expected), market capitalization, sector, prices, liquidity, and other metrics related to the underlying asset and the cliquet combo. Financial market data may also include measures, estimates, and other related data for options (e.g., calls, puts), futures, and other derivatives for the cliquet combo. The input datasets may also include corresponding log files to describe and store the financial market data e.g., a log file describing cliquet combos. The log files may include metadata to tag or characterize data, e.g., corresponding time periods for which the data was recorded. For example, the log files may include a tag to be used for sorting or filtering the data of the log files.

Upon receiving input datasets from the communication interface 202, including data stored in the market data storage 204, the trading engine 236 may perform further processes including receiving requests and accessing metadata. The trading engine 236 may perform operations using the trading engine processor 208, with instructions stored in the trading engine logic 212, and data stored in trading engine data 210. The data stored in trading engine data 210 may include all of or a subset (e.g., filtered) of the data stored in market data storage 204, where the subset of the data stored in the trading engine data 210 is filtered based on a specified time period. The trading engine 236 may perform operations on the trading engine data 210 including deleting, archiving, tagging, and resetting. The trading engine 236 can utilize metadata, including log files, to process (e.g., filtering, sorting) the trading engine data 210.

The trading engine 236 may also access other components of the exchange computer system 200 including the order matching system 234, order routing system 232, rules database 238, and storage 240. The order matching system 234 may be configured to match an order received from the user device (e.g. user devices 116, 118, and 120) to another order based on the matching rules stored in the rules database 238. The order routing system 232 may be configured to route the order received from the user device to a destination associated with the order. The storage 240 may include additional data from the exchange computer system 200, accessed by the trading engine 236 for processing.

As noted above, the exchange computer system 110 can securely transmit information related to cliquet combos based on data received over successive periods of time to connected user computing devices (e.g., user devices 116, 118, 120) that are themselves configured to display the information. The information may be displayed, for example, within a graphical user interface of an application that facilitates continuous real-time generation, trading, and settlement of cliquet combos through the exchange computer system.

Figure 3:
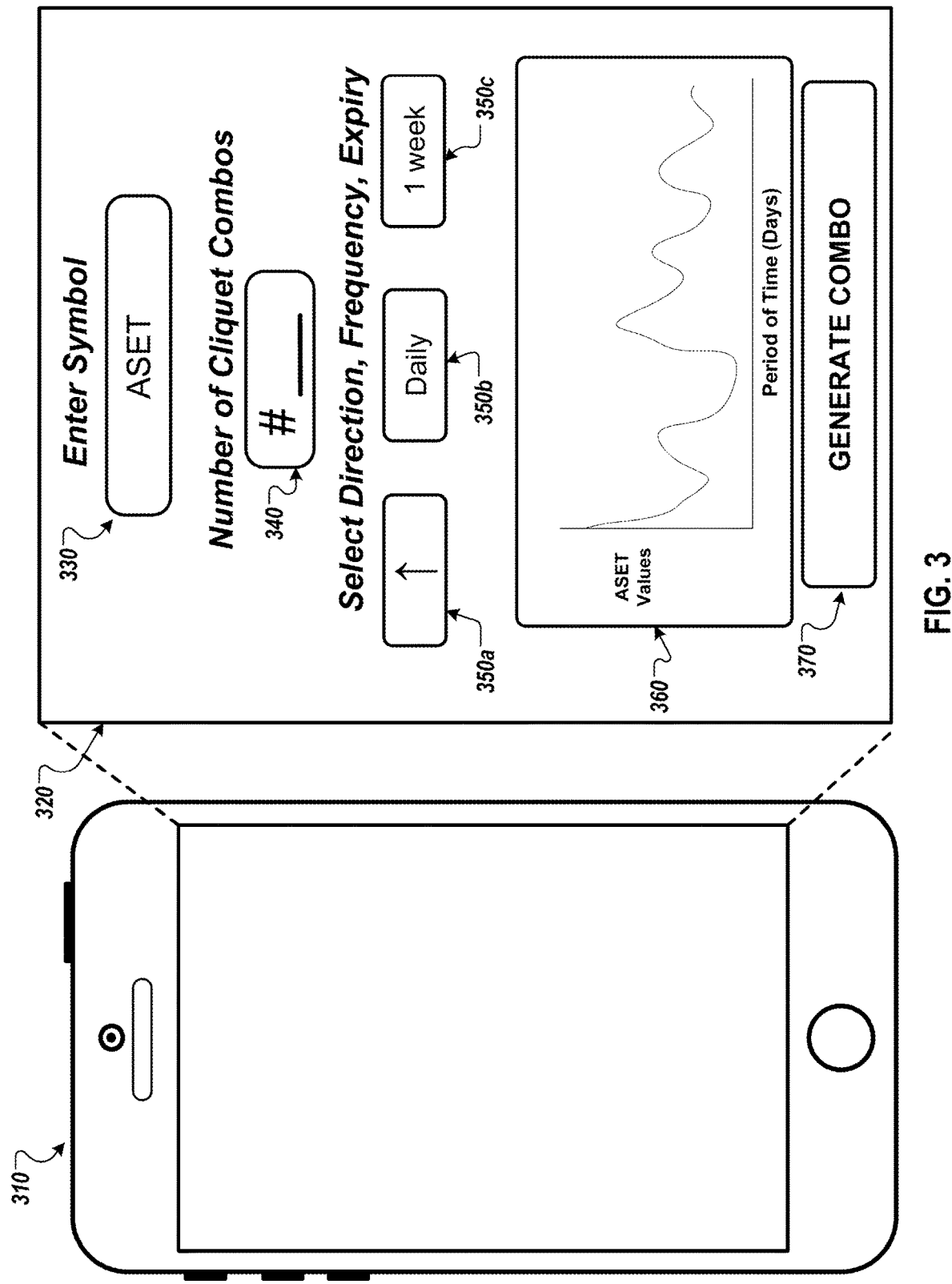
FIG. 3 is an illustration of an exemplary graphical user interface for trading and generating cliquet combos.

FIG. 3 is an illustration of an exemplary graphical user interface on a device 310 for obtaining user inputs that determine data related to a request to generate a cliquet combo. A client device (e.g., user devices 116, 118, and 120) can, for example, display the graphical user interface after receiving a user input indicating interest in placing an order. A user of a device 310 can interact with a user interface panel 320 created by the device 310 after receiving data (e.g., trading engine data 210) from the exchange computer system by a computer network (e.g., network 214). The user interface panel 320 can include fields that enable a user to enter a symbol (e.g., a stock or option symbol), select the type of the trade and specify an amount. As an example, the user can enter a symbol (e.g., "ASET") corresponding to an underlying asset and generate a cliquet combo through the device 310.

The user interface panel 320 can include fields that enable a user to enter a symbol for an underlying asset corresponding to the desired cliquet combo (e.g., a stock symbol). The user interface 320 can also include fields that enable a user to select a quantity of desired cliquet combos, a direction of movement of the value of the asset, an expiry, and a frequency, e.g., a number of reset periods, a fixed reset period to determine the number of reset periods. For example, the user of the device 310 can specify a symbol in field 330 and a number of cliquet combos in field 340. The user of device 310 can also specify a direction 350a, a frequency 350b, and an expiry 350c, e.g., expiration date of the cliquet combo that can also indicate a maturity date of the replicated forward. Alternatively, or in addition, the graphical user interface may be configured to pose a series of questions to the user, in which case inputs may be provided by the user through the graphical user interface as corresponding answers to the series of questions.

After the user has entered necessary data and selected generate combo button 370, data related to the requested cliquet combo is provided to the exchange computer system, which generates the cliquet combo. The exchange computer system can, for example, generate a cliquet combo based on a value of the underlying financial asset, a direction of change of value of the underlying financial asset, and a frequency or number of reset periods for the cliquet combo. For example, the exchange computer system can generate the requested cliquet combo as a series of free-rolling contracts with each of the contracts having an equal time to expiry.

The disclosed systems and related user interfaces simplify the creation of cliquet combos, e.g., series of forwards, by enabling users to specify timing in terms of natural language. For example, a user of device 310 may specify a frequency, e.g., number of reset periods, and an expiry, e.g., a maturity of a cliquet combo. The maturity of the cliquet combo may be considered the expiry of the last contract in the series of contracts represented by the generated combo. The expiry for the cliquet combo can be entered or described in terms of hours, days, weeks, months, years (e.g., "today", "tomorrow", "this week", "next week", "one week from today," "two weeks from Friday" "this March", "next August", and so on), and the frequency for the cliquet combo can similarly be entered or described in terms of hours, days, weeks, months, or years. A frequency provided by the user can indicate the number of contracts and reset periods for the cliquet combo during which the cliquet combo will successively rollover, and an expiry provided by the user can indicate the maturity of the cliquet combo, e.g., the expiry of the final contract in the series of contracts of the cliquet combo.

The user interface panel 320 may receive a series of data related to financial instrument values over successive periods of time, and the manner in which the user interface panel 320 displays these values and/or related data may be customizable based on user preferences or other parameters. As an example, the information displayed in user interface panel 320 may be customized to include both numerical and/or graphical representations of past, present, and/or projected values of the cliquet combo and/or underlying assets. The user interface panel 320 may additionally be customized to display information regarding present, past, and/or projected activities based on values (e.g., trading of financial instruments based on the cliquet combo, and other market activity related to the cliquet combo). For example, the user interface panel 320 may optionally display values of, and activity related to, financial instruments related to the cliquet combo, including underlying assets and/or derivatives.

The manner in which user interface panel 320 displays information may also vary depending on other parameters. For example, the computational resources of the user devices connected via network 114 to the exchange computer system 110 can vary greatly, and the user interface panel 320 may be adapted for display on each particular user device based on parameters associated with that device (including screen size, display resolution, processing speed, and available bandwidth). For instance, a user operating a PC may benefit from display of a larger amount of information, whereas a user interacting with the exchange via a smart phone might benefit from a more streamlined presentation of information. As another example, where bandwidth or processing resources are limited, user interface panel 320 can be configured to display information in less resource-intensive ways (e.g., through simplified graphics and text).

Various suitable types of panels 320 can be used to enter order information and additional information from a user. For example, inputs may be provided by a user as entries in fields (e.g., 330, 340, 350a, 350b, 350c), or as selections of buttons (e.g., 370) displayed within the graphical user interface. Alternatively, or in addition, the graphical user interface may be configured to pose a series of questions to the user, in which case inputs may be provided by the user through the graphical user interface as corresponding answers to the series of questions.

When placing an order, a user may enter an asset by ticker name, e.g., symbol, in field 330, a number of cliquet combos 340 to generate, a direction 350a, a frequency 350b, and expiry 350c by interacting the user interface panel 320. The device 310 can use data related to cliquet combos to provide the user with additional customizations options for an order.

A graph 340 may display values for an underlying asset of the desired cliquet combo(s) for a period of time (e.g., 30 days, 60 days, 1 year). The graph 340 can be provided and displayed to the panel 320. The user of the device 310 may select additional display options (e.g., time windows, historical correlation data) for the graph 340. The graph 340 may display a series of values, e.g., prices, for an underlying asset over various time periods based on user customization. A generate button 370 is provided and displayed on the panel 320. After data has for an order has been selected by the user via the user prompts, the generate button 370 may be used to transmit the data to the exchange computer system 200 via the network 214. For example, the user interface panel 320 may display a premium price and expiry date for a generated cliquet combo, as well as the expiry date for each contract in the series of contracts.

Table 1 below provides examples of parameters that can be set with respect to particular cliquet combos. Each example cliquet combo can replicate the total return forward, e.g., "TR Forward" of the underlying asset. For example, the cliquet combos can replicate forward curves tailored to include the total returns, e.g., dividends, interest, with varying maturities, e.g., a week, a month, three months, a year. Although illustrated below with example reset frequencies and duration times, any day, month, year, or period of time may be used as a reset frequency and duration.

TABLE 1

| Cliquet Combo Type | Replication of TR Forward | Reset Frequency | Duration |
| --- | --- | --- | --- |
| $C^2$ | Spot | Daily | 1-year |
| $C^2$-week | 1-week | Each Friday | 1-year |
| $C^2$-month1 | 1-month | Each $3^{rd}$ Friday | 1-year |
| $C^2$-month3 | 3-months | Each Quarterly $3^{rd}$ Friday | 1-year |
| $C^2$-year1 | 1-year | Each $3^{rd}$ Friday of December | 5-years |

A quotation for each cliquet combo type may also be displayed on the user interface panel 320. The quotation for a cliquet combo may be based on the premium for the cliquet combo and the respective number of reset periods, e.g., how frequently the each contract resets. The premium may be adjusted based on data related to the underlying asset, e.g., price, and can be adjusted at the expiry of each contract in the cliquet combo. For example, a cliquet combo with a daily reset frequency, e.g., reset period of one day, and a duration of one year, may have an initial combo premium that is divided by the number of reset periods (e.g., 252 trading days in a year). As each reset period concludes, e.g., a contract meets its respective expiry and the next contract in the series of contracts is enabled, the combo premium is adjusted based on the same number of reset periods and the data related to the underlying asset of the cliquet combo.

Figure 4:
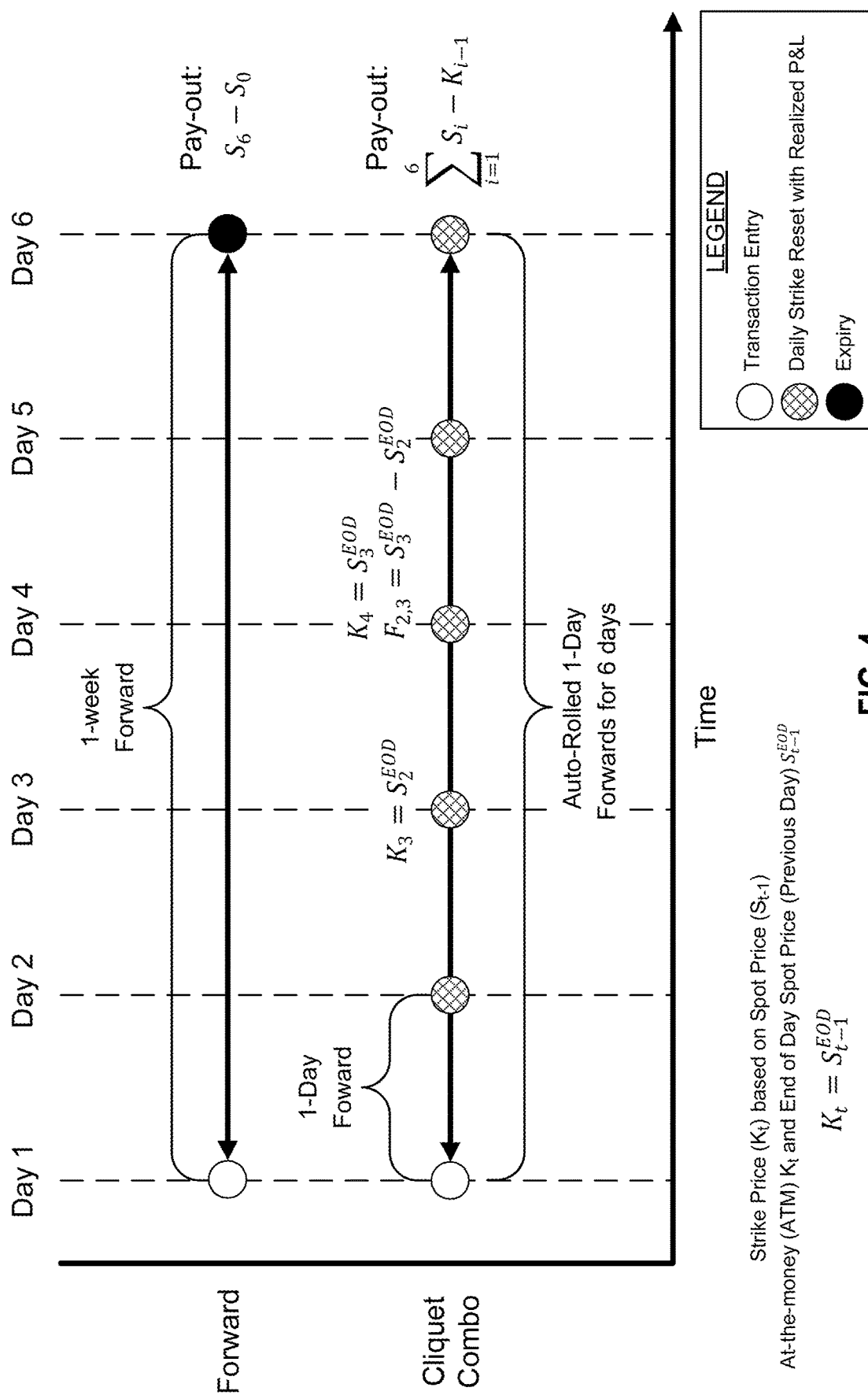
FIG. 4 is a graph illustrating an exemplary forward and an exemplary cliquet combo.

FIG. 4 shows a graph that compares the maturity of an exemplary forward contract (indicated as "forward") to the maturity of an exemplary cliquet combo for an underlying asset. The example illustrated in FIG. 4 is merely one example comparison of a forward contract and cliquet combo. Cliquet combos can be generated and provided for any number of days, durations, frequencies, reset periods, and so on, independent of any forward contract or asset to be replicated. The underlying asset, also referred to as "the asset", may be any financial instrument, e.g., stock, option, as well as any number of financial instruments, e.g., stock market index, or some combination therein.

As shown, the forward contract and the cliquet combo have a same start date, e.g., activation date, and a same expiration date, maturity date. In other words, the duration of the cliquet combo is illustrated to be the same as the time until expiration for the forward contract. In this example, the maturity of a one-week forward contract is compared to the maturity of a one-week, daily reset cliquet combo. The duration of the cliquet combo is one week and the cliquet combo resets every day at the expiry of a contract in the series of contracts, e.g., except for the last contract in the series, corresponding to the expiry of the cliquet combo.

The forward contract and the cliquet combo may be purchased at "day 0" (not illustrated), but enter the transaction on the first trading day, e.g., "day 1", for which the forward contract and the cliquet combo are valid, e.g., after the "day 0" activation date. As both the forward contract and the cliquet combo have the same expiry, "day 6" in the illustration represents one week, e.g., in trading days, from the purchase of the forward contract and the cliquet combo. The cliquet combo being one week in duration and resetting daily, indicates a number of forward contracts to be generated for the cliquet combo. As an example, the cliquet combo can be made up of 1-day forward contracts as the cliquet combo was generated with an input indicating daily reset for the duration, e.g., desired expiry, of the cliquet combo.

The number of 1-day forward contracts is determined by the reset period, e.g., a one-week cliquet combo can have six, consecutive 1-day forward contracts. The first 1-day forward contract in the series of forward contracts is active at the activation date of the cliquet combo, and expires at the end of the first reset period, e.g., first expiry date, corresponding to the first 1-day forward contract. The following 1-day forward contract, e.g., the second 1-day forward contract after the first 1-day forward contract, becomes active at the expiry of the previous 1-day forward contract, e.g., the first 1-day forward contract. Each 1-day forward contract rolls over to the next, successive 1-day forward contract, described as a "free-roll" of forward contracts in the cliquet combo. The last 1-day forward contract in the series of forward contracts shares an expiry date with cliquet combo, e.g., as provided by a user input when the cliquet combo is first generated.

In more detail, the forward contract and the cliquet combo enter as a valid transaction at "day 1", with each day having a respective spot price $S_i$ of the asset, e.g., from data related to the underlying asset. The spot price $S_i$ of the asset may be a closing price, e.g., a price of the asset at the end of business hours for an exchange, on the corresponding day, e.g., $S_1$ is the last price for the asset trades at the exchange on day 1 during a regular trading session. The spot price $S_i$ may be an adjusted price of the asset that includes sources of returns, costs, and other characteristics of the asset such as dividends of the asset and interest rates. The cliquet combo also has a respective strike price $K_i$ of the forward for each forward contract on the corresponding day, in the series of forward contracts, as described further below.

Each strike price $K_i$ is based on a previous spot price $S_{i-1}$, e.g., the spot price of the asset on the previous day. The strike price $K_i$ is illustrated as an at-the-money strike price that is determined by the spot price of the asset at the end of the previous day, e.g., $S_{i-1}^{EOD}$. In some implementations, the strike price $K_i$ (e.g., an at-the-money strike price) may be determined by financial instrument data, e.g., prices, volatilities, options, stock market indexes, stored on the exchange computer system. For example, the price of a financial instrument such as a stock, option, stock market index option, and so on can be used to determine strike prices in the cliquet combo. Although the strike price $K_i$ is illustrated as an at-the-money strike price for the corresponding 1-day forward contract, any strike price, e.g., in-the-money, out-of-the-money, may be used for the 1-day forward contract. Additionally, the strike price $K_i$ may be dependent on the spot price of asset at a different time of day, e.g., any time during the trading session.

The forward contract has a payout based on the spot price of the asset at day 0, e.g., the activation date, and at day 6, e.g., the expiry date, for the forward contract. For example, the payout for the 1-week forward contract would be spot price of the asset on day 6, e.g., $S_6$, subtracted by the spot price on day 0, $S_0$, or $S_6$-$S_0$ for the total payout. The forward contract may be executed with an expectation that the value, e.g., a price, of the asset may change, e.g., increase or decrease, based on a desired trading strategy. Because of the rigid conditions in trading forward contracts, there is significant exposure to drastic changes in the value of the asset, e.g., volatility (implied or actualized), as well as changes in interest rates and dividend returns, which can be due to external market factors and conditions.

The cliquet combo has a payout based on the spot price and the strike price for each contract, e.g., 1-day forward contracts, in the series of forward contracts. For example, a 1-day forward that activates on day 2 and expires on day 3 has a strike price $K_3$ that is equal to the spot price of the asset for the previous day, e.g., $S_2^{EOD}$. The payout for a 1-day forward contract is the difference between $S_i$, e.g., the spot price for that day, and $K_{i-1}$ the strike price for the 1-day forward contract determined on a previous day. For example, the payout for the 1-day forward contract that starts on day 2 and expires on day 3 is $S_3-K_3$ e.g., the spot price of the asset on day 3 subtracted by the strike price of the 1-day forward contract on day 2. The total payout for the cliquet combo would be the sum of payouts across the entire cliquet combo, e.g., the entire series of 1-day forward contracts from the activation date to the expiry date.

An advantage of the cliquet combo compared to conventional forward contracts, is that a profit or loss for the cliquet combo is provided at the end of each reset period for each 1-day forward contract, instead of the total payout provided at the expiry of the cliquet combo. In other words, the daily reset of the cliquet combo enables a daily strike reset with realized profit and loss. The daily strike reset of the cliquet combo indicates that the strike price of a forward contract for a time period, e.g., a second reset period, can be adjusted based on the spot price of the asset from a previous time period, e.g., a first reset period. Any number of days, weeks, months, or years may be used as a reset period, thereby interpolating a forward price using each forward contract in the cliquet combo. For example, the realized profit and loss of a 1-day forward contract between day 4 and day 5 of the cliquet combo can describe a forward price of the asset from day 2 to day 3, e.g., a difference between the spot price at day 3 and the spot price at day 2. As illustrated, the forward price of the asset may be described as $F_{2,3}=S_3^{EOD}-S_2^{EOD}$, representing a difference between end-of-day spot prices for the asset.

In some implementations, the series of forward contracts of the generated cliquet combo can be a series of synthetic forwards, e.g., each forward contract is replicated by a call option and a put option with the same strike price and expiry. In other words, the expiry of the forward contract is the same for the call and the put options. While each pair of call and put options are listed, e.g., as an example of information about the generated cliquet combo that can be provided to one or more devices, the pairs of call and put options are not tradeable unless the entirety of the generated cliquet combo is purchased or sold. In some implementations, the series of contracts of the generated cliquet combo can be a series of options called a cliquet option. Input data provided in a request to generate a cliquet option may be used to determine a number of reset periods, expiry dates, premium prices, and so on for the cliquet option. As an example, the cliquet option may be a series of forward-starting, at-the-money options, which can be provided to a user that requested the cliquet option. The series of forward-starting options can also be configured at different strike prices based on the data related to financial instruments.

As described above, the effective implementation of a series of forward contracts is a highly complicated process that would typically involve multiple transactions if relying upon standard forward contracts. Furthermore, the strike-price dependency of each forward contract in the cliquet combo provides an advantage compared to conventional forward contracts, in that the cliquet combo enables a delta-one strategy. For example, each of the successive contracts has a strike price dependent on the spot price of the asset in a previous reset period, that is be further improved upon when the spot price is adjusted with total return data, e.g., dividends, capital gains, interest rates, and other sources of returns. The cliquet combo provides a strategy with robust price-tracking of an asset and volatility insensitivity (e.g., with respect to market conditions) through the reset periods and strike-price dependency of the components of the cliquet combo, e.g., each forward contract in the series of forward contracts.

By reducing a number of transactions to mimic a forward price curve for an underlying security, the generated cliquet combo reduces the number of transactions required to execute a complex trading strategy, e.g., delta-one. The cliquet combo also provides alternative orders to provide delta-one exposure, similar to futures contracts and exchange traded funds but with improved price tracking and lower costs. The cliquet combo enables a significant reduction in order volume, e.g., by submitting one order instead of a series of precisely timed orders. By reducing the number of orders, generated cliquet combos offer reduced traffic for exchange computer systems, enabling improved performance for any electronic exchange.

Furthermore, the premium for the cliquet combo is paid at the end of each reset period, e.g., when a contract in the series of contracts expires, and therefore spreads the cost of the cliquet combo over a longer period time, relative to a comparable forward contract. Additionally, the realized profit and loss is determined at each expiry, e.g., each reset period, of the cliquet combo, which can provide returns sooner or spread losses over a longer duration than a conventional forward contract. Costs may also be reduced to the fewer number of orders, e.g., transactions, that are submitted for a delta-one strategy can instead be fulfilled by the generated cliquet combo. Since the forward contacts of the cliquet combo are auto-rolled, no further transactions are necessary to fulfill complex trading strategies, resulting in fewer orders submitted and fees paid. Reducing overall numbers of transactions can achieve significant computer resources for the exchange and networked devices, providing improved computational and market efficiency.

Figure 5:
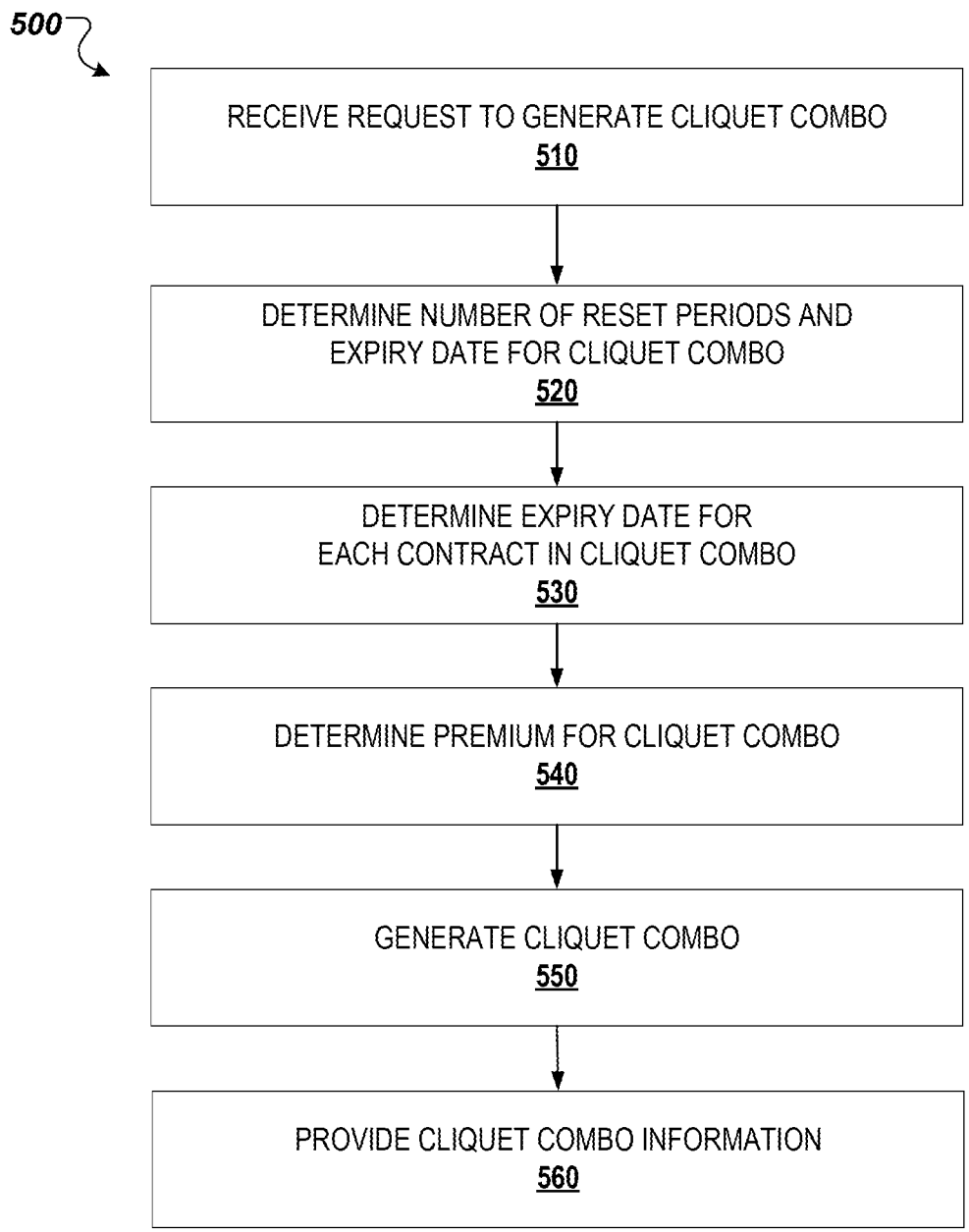
FIG. 5 is a flowchart of an example process for generating cliquet combos.

FIG. 5 is a flowchart of an exemplary process 600 for generating cliquet combos in an exchange computer system similar to the exchange computer system 110 described with respect to FIG. 1. Requests to generate cliquet combos may be received from user devices, such as user devices 116, 120, or market participants 122. Data related to the requests to generate cliquet combos, such as user inputs may be received from a device 310, as described in FIG. 3 above. As described above, the data related to the underlying asset of the cliquet combo may be received by one or more remote computing devices connected to the exchange computer system by a computer network.

In operation 510, the trading engine, e.g., trading engine 136, of the exchange computer system receives, from a remote user device, data related to a request to generate a cliquet combo.

The data related to a request to generate a cliquet combo can include an underlying asset corresponding to the cliquet combo, as well as a direction of movement of the value of the asset, an expiry, and a frequency. The underlying asset may be any financial instrument, such as a stock traded on a stock exchange, an option traded on an options exchange. The underlying asset may also be an index, e.g., a stock market index, as well as a stock market index option, e.g., an option corresponding to the stock market index. The direction of movement can indicate an increase or decrease of the value of the underlying asset, e.g., at the expiry date of the cliquet combo.

The expiry date, e.g., a maturity date for a forward contract, indicates the time, e.g., a number of days, weeks, months, which a cliquet combo can be settled at a specified price. For example, the expiry of the cliquet combo can indicate when the final contract in the series of contracts at the expiry date of the cliquet combo, e.g., settle at the specified price of the underlying asset. The frequency associated with the cliquet combo describes how frequently the cliquet combo resets, e.g., a second contract in the series of contracts becomes active when a first contract in the series expires. In other words, the frequency and the expiry associated with the cliquet combo can be used to determine a number of contracts in the series of contracts for the generated cliquet combo.

In operation 520, the trading engine determines a number of reset periods and an expiry date for the cliquet combo based on the data related to the request to generate the cliquet combo. For example, the number of reset periods may be based on a frequency and an expiry, e.g., a duration, corresponding to the cliquet combo. The frequency and expiry may be provided as user inputs for the reset to generate the cliquet combo. In some implementations, the number of reset periods may be based on a number of trading days for which an exchange computer system may operate, e.g., during business hours, excluding holidays.

In operation 530, the trading engine determines an expiry date for each contract in the cliquet combo based on the determined number of reset periods. The trading engine may use the number of reset periods to determine a number of contracts in the series of contracts for the cliquet combo. As an example, the expiry date for each contract may be a fixed period, e.g., some number of days, weeks, months, which is inversely proportional to the specified frequency, e.g., number of times a contract reset occurs in the cliquet combo, in the data related to the request to generate the cliquet combo option. In some implementations, multiple frequencies can be selected to indicate multiple reset periods. For example, a first frequency can indicate a first number of contracts with a first fixed period to determine the respective expiry dates of first number of contracts. A second frequency can indicate a second number of contracts, different from the first number of contracts in the series of contracts, with a second fixed period to determine the respective expiry dates of the second number of contracts.

In operation 540, the trading engine determines a premium price for the cliquet combo based on the determined expiry date of the cliquet combo and the data related to the underlying asset. The data related to the underlying asset can include volatilities, interest rates, dividends, returns (e.g., historical, expected), market capitalization, sector, prices, liquidity, and other metrics related to the underlying asset and the cliquet combo. In some implementations, the data related to the underlying asset can be interest rate and interest rate data that includes the Secured Overnight Financing Rate (SOFR), e.g., an example measure of the cost of borrowing cash overnight collateralized by Treasury securities.

The premium price may be based on a value of the underlying asset, but can also include premium data for other types of financial instruments, e.g., options premiums. The premium price may be updated throughout the span of the cliquet combo, e.g., from the first entry of the first contract in the series of contracts to the expiry of the last contract in the series of contracts. Premium prices for the cliquet combo may be based on a forward price at the expiry date of the cliquet combo.

In some implementations, the trading engine adjusts a premium price for each contract in the series of contracts for the cliquet combo. For example, the premium price for the cliquet combo may be divided by the number of reset periods to determine a premium for the cliquet combo at the expiry of each contract in the series of contracts. While the number of reset periods may be fixed, e.g., determined from data related to the request that generated the cliquet combo, the premium price of the cliquet combo may change based on data related to the underlying asset, e.g., a change in the value of the underlying asset. The change in the premium price for the cliquet combo may increase or decrease, thereby adjusting the premium for the cliquet combo at the expiry of the next contract in the series of contracts. For example, the premium price for the cliquet combo may be a first price at the expiry of a first contract in the series of contracts. The premium price for the cliquet combo may be adjusted from the first price to a second price at the expiry of a second contract in the series of contracts. In some implementations, the adjustment of the premium may be change based on data related to the underlying asset, such as volatility, liquidity, interest rates, and so on. The premium of the cliquet combo is an interpolation, e.g., a linear interpolation, of the forward curve for an underlying asset.

In operation 550, the trading engine generates the cliquet combo. The trading engine generates a series of contracts with corresponding expiry dates from the data related to the request to generate the cliquet combo. For example, data related to the request can include a duration, a frequency, and a direction for the desired generated cliquet combo. The generated cliquet combo includes a series of contracts, in which a successive contract is valid after the expiry of a previous contract, e.g., with respective to the successive contract. In other words, a first contract in a series of contracts is valid for a first reset period with a first expiry date. At the end of the first reset period, the first contract expires reaches the first expiry date and a second contract in the series of contracts is valid for a second reset period until a second expiry date. Each of the successive contracts continue to be valid during the respective reset periods and expire at the respective expiry dates until the last contract expires, e.g., at the expiry date of the cliquet combo.

In operation 560, the trading engine provides the generated cliquet combo and information about the cliquet combo to one or more user devices, such as user devices 116, 120, as well as market participants 122. The generated cliquet combo and cliquet combo information may also provided to a user device that transmitted the request, e.g., device 310, as described in FIG. 3 above. Cliquet combo information can include the expiry date and premium associated with the generated cliquet combo, but can also include information about each contract in the series of contracts such as the respective expiry dates and reset periods. In some implementations, the data related to the underlying asset for the reset period of a respective contract may be provided to a user device. In some implementations, the data related to the underlying asset for the entire duration of the cliquet combo, e.g., from generation to the expiry of the cliquet combo, may be provided to a user device.

Figure 6:
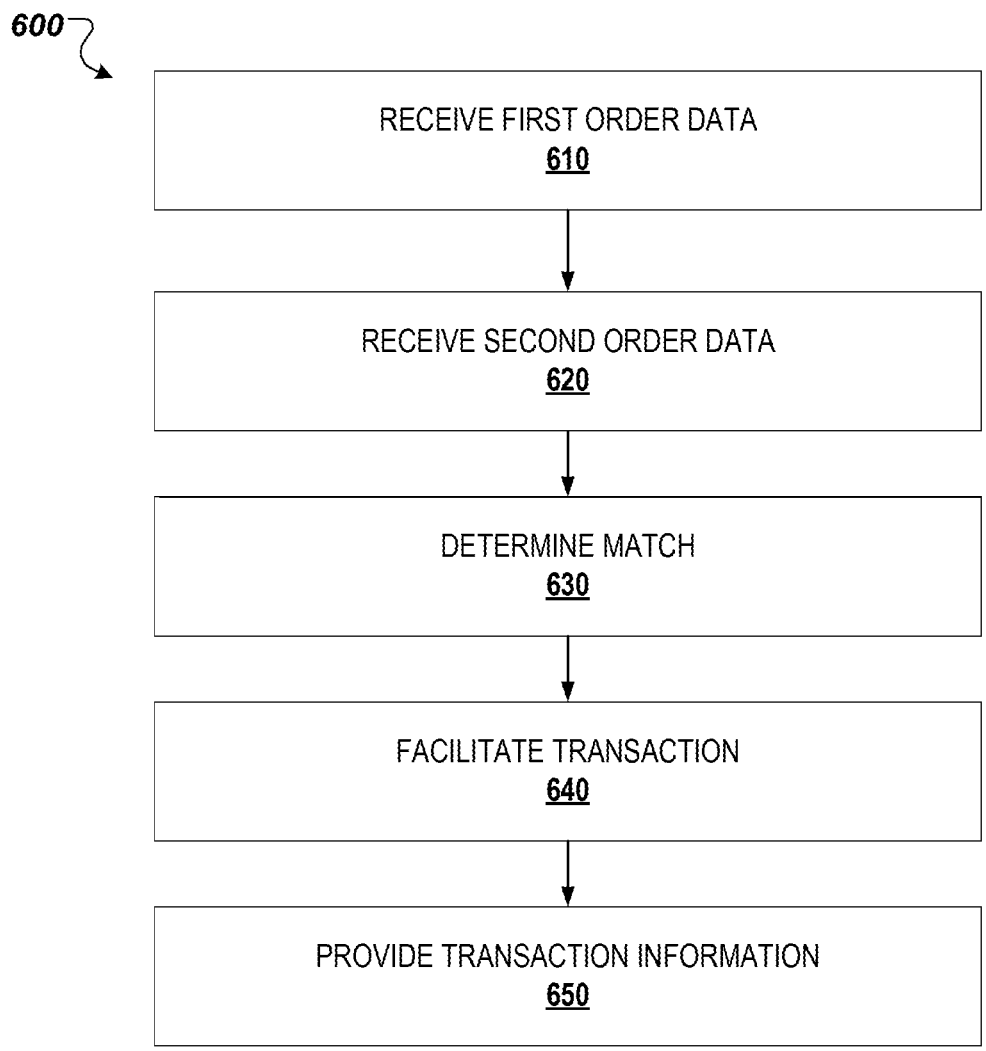
FIG. 6 is a flowchart of an example process for processing orders for cliquet combos.

FIG. 6 is a flowchart of an exemplary process 600 for processing orders for cliquet combos in an exchange computer system similar to the exchange computer system 110 described with respect to FIG. 1. Orders may be received from user devices, such as user devices 116, 120, or market participants 122.

The exchange computer system may, for example, include at least one communication interface that is configured to receive, from one or more remote computing devices connected to the exchange computer system via a computer network, data related to one or more financial instruments. The exchange computer system may also include at least one non-transitory computer-readable medium configured to store the received data, and a trading engine having at least one hardware processor coupled with the at least one non-transitory computer-readable medium. The at least one non-transitory computer-readable medium may be further configured to store computer-executable instructions that when executed by the at least one hardware processor, cause the trading engine to perform various processes.

In operation 610, the exchange computer system receives, from a first remote user computing device, data related to a first order for a first cliquet combo and one or more user inputs that determine the data related to the request to generate the first cliquet combo at the at least one communication interface. The first order may be, for example, an order to purchase the cliquet combo generated through a graphical user interface of an application that facilitates continuous real-time trading, through the exchange computer system, of cliquet combos. In some implementations, the first order may to be to trade, e.g., buy, sell, or some combination therein, multiple cliquet combos.

In more detail, the first remote user computing device may be configured to display data related to the first cliquet combo within the graphical user interface, and to receive, through the graphical user interface, one or more user inputs that determine the data related to the first order for the cliquet combo. After the data is provided by the user through the graphical user interface, it can be sent to the exchange computer system by the first remote user computing device, and received by the exchange computer system.

In operation 620, the exchange computer system receives, from a second remote user computing device, data related to a second order. The second order may be, for example, an offer to purchase or sell a cliquet combo. For example, the first order may indicate an offer to sell the first cliquet combo while the second order may be an offer to purchase a cliquet combo at a specified price.

In operation 630, the exchange computer system determines, based on the data related to the first order and the data related to the second order, and one or more matching rules, that the first order and the second order match. For example, the first order indicates an offer to sell the first cliquet combo, the second order may be an offer to purchase a cliquet combo at a specified price. As an example, the first order and the second order may match when both orders meet at a specified price, e.g., an accepted price for bidding of the cliquet combo meets an accepted price for offering the cliquet combo.

In operation 640, responsive to determining that the first order and the second order match, the exchange computer system facilitates a transaction. For example, ownership of the cliquet combo may transfer from a user offering to sell the cliquet combo in the first order, to the user bidding to buy the cliquet combo in the second order.

In operation 650, responsive to facilitating the transaction, the exchange computer system sends data to the first remote user computing device that causes the graphical user interface to indicate that the transaction has been completed. In some implementations, the exchange computer system may send data to multiple user computing devices that may be remote from the exchange computer system.

For example, upon completion of the transaction associated with the first and second orders, data, such as fill information may be passed through the exchange com-computer system's order matching system and the order routing system to one or more user devices, including each of the devices associated with the transaction. The exchange computer system may also forward data related to the matched trade to a third party organization that verifies the proper clearance of the trade, and may send additional information through an internal distribution system that refreshes display screens on a trading floor. The completed order can also be submitted to a quote and trade dissemination service.

A number of implementations have been described hereinabove. It should however be understood that various modifications may be made without departing from the spirit and scope of the disclosure. For example, various forms of the flows shown above may be used, with steps re-ordered, added, or removed. Accordingly, other implementations are within the scope of the disclosure and claims.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

Thus, particular embodiments have been described. Other embodiments are within the scope of the following claims. For example, the actions recited in the claims may be performed in a different order and still achieve desirable results.

What is claimed is:

1. An exchange computer system configured to continuously and securely generate cliquet combos, the exchange computer system comprising:

at least one communication interface that is configured to receive, from one or more remote computing devices connected to the exchange computer system via a computer network, data related to one or more underlying assets;

at least one non-transitory computer-readable medium configured to store the data related to the one or more underlying assets; and a trading engine comprising at least one hardware processor coupled with the at least one non-transitory computer-readable medium, wherein the at least one non-transitory computer-readable medium is further configured to store computer-executable instructions that when executed by the at least one hardware processor, cause the trading engine to perform processes comprising:

receiving, from a remote user computing device, data related to a request to generate a cliquet combo, wherein the cliquet combo comprises a series of contracts, wherein the remote user computing device is configured to display data related to the cliquet combo within a graphical user interface of an application that facilitates continuous real-time trading, through the exchange computer system, of underlying assets including cliquet combos, and wherein the remote user computing device is further configured to receive, through the graphical user interface, one or more user inputs that determine the data related to the request to generate the cliquet combo;

determining, based on the data related to the request to generate the cliquet combo, a number of reset periods for the series of contracts and an expiry date for the cliquet combo, wherein the at least one hardware processor of the trading engine is configured to provide control data comprising signals representing the number of reset periods for the series of contracts in the cliquet combo, each signal corresponding to the respective expiry date for each contract in the series of contracts of the cliquet combo;

determining, based on the number of reset periods for the series of contracts and the expiry date for the cliquet combo, an expiry date for each contract in the series of contracts;

determining, based on the expiry date for the cliquet combo and the data related to the one or more underlying assets, a premium for the cliquet combo;

generating the series of contracts for the cliquet combo, based on the expiry date for each contract in the series of contracts and the premium for the cliquet combo, each option in the series of contracts having customized parameters that include a strike price and the corresponding expiry date; and securely transmitting data related to the generated cliquet combo to the remote user computing device, wherein the remote user computing device is connected to the exchange computer system via the computer network and is configured to display the data related to the generated cliquet combo within the graphical user interface.

2. The exchange computer system of claim 1, wherein a second contract in the series of contracts becomes active when a first contract in the series of contracts expires.

3. The exchange computer system of claim 1, wherein an expiry date of a final contract in the series of contracts is the expiry date of the cliquet combo.

4. The exchange computer system of claim 1, wherein the at least one non-transitory computer-readable medium is further configured to store additional computer-executable instructions that when executed by the at least one hardware processor, cause the trading engine to perform additional processes comprising:

determining an at-the-money strike price for each contract in the series of contracts at the corresponding expiry date, based on the data related to the one or more underlying assets.

5. The exchange computer system of claim 1, wherein the at least one non-transitory computer-readable medium is further configured to store additional computer-executable instructions that when executed by the at least one hardware processor, cause the trading engine to perform additional processes comprising:

determining an at-the-money strike price for a second contract in the series of contracts at the expiry date of a first contract in the series of contracts, based on the data related to the one or more underlying assets.

6. The exchange computer system of claim 5, wherein the one or more underlying assets are one or more stocks traded on a stock exchange, and wherein the data related to the one or more underlying assets comprises a price for each of the one or more stocks.

7. The exchange computer system of claim 5, wherein the one or more underlying assets are one or more options traded on an options exchange, and wherein the data related to the one or more underlying assets includes a price for each of the one or more options.

8. The exchange computer system of claim 1, wherein the at least one non-transitory computer-readable medium is further configured to store additional computer-executable instructions that when executed by the at least one hardware processor, cause the trading engine to perform additional processes comprising:

adjusting the premium for the cliquet combo at the expiry date of each contract in the series of contracts, based on the data related to the one or more underlying assets.

9. The exchange computer system of claim 2, wherein the at least one non-transitory computer-readable medium is further configured to store additional computer-executable instructions that when executed by the at least one hardware processor, cause the trading engine to perform additional processes comprising:

adjusting the premium for the cliquet combo at the expiry date of the second contract in the series of contracts, based on the data related to the one or more underlying assets.

10. The exchange computer system of claim 9, wherein adjusting the premium for the cliquet combo at the expiry date of the second contract in the series of contracts further comprises adjusting the premium for the cliquet combo based on interest rate data.

11. The exchange computer system of claim 1, wherein the data related to the generated cliquet combo that is displayed within the graphical user interface comprises the premium for the cliquet combo, the expiry date for the cliquet combo, and the expiry date for each contract in the series of contracts.

12. The exchange computer system of claim 1, wherein the at least one non-transitory computer-readable medium is further configured to store additional computer-executable instructions that when executed by the at least one hardware processor, cause the trading engine to perform additional processes comprising:

receiving from the remote user computing device, data related to a first order for a first cliquet combo, wherein the remote user computing device is configured to display data related to the first cliquet combo within the graphical user interface, and wherein the remote user computing device is further configured to receive, through the graphical user interface, one or more user inputs that determine the data related to the first order for the first cliquet combo;

receiving, from a second remote user computing device, data related to a second order;

automatically determining, based on the data related to the first order for the first cliquet combo and the data related to the second order, that the first order for the first cliquet combo and the second order match;

responsive to automatically determining that the first order for the first cliquet combo and the second order match, facilitating a transaction; and responsive to facilitating the transaction, sending data to the remote user computing device that causes the graphical user interface to indicate that a transaction has been completed.

13. The exchange computer system of claim 12, wherein the exchange computer system is a distributed computer system comprising:

the at least one communication interface;

the at least one non-transitory computer-readable medium;

the trading engine;

an order entry port configured to receive the data related to the first order for the first cliquet combo and the data related to the second order, wherein the first cliquet combo is the generated cliquet combo; and an order routing system.

14. The exchange computer system of claim 13, wherein the at least one non-transitory computer-readable medium is further configured to store additional computer-executable instructions that when executed by the at least one hardware processor, cause the trading engine to perform additional processes comprising: receiving from the remote user computing device, data related to a first order for a first cliquet option, wherein the remote user computing device is configured to display data related to the first cliquet option within the graphical user interface, and wherein the remote user computing device is further configured to receive, through the graphical user interface, one or more user inputs that determine the data related to the first order for the first cliquet option; receiving, from a second remote user computing device, data related to a second order; automatically determining, based on the data related to the first order for the first cliquet option and the data related to the second order, that the first order for the first cliquet option and the second order match; responsive to automatically determining that the first order for the first cliquet option and the second order match, facilitating a transaction; and responsive to facilitating the transaction, sending data to the remote user computing device that causes the graphical user interface to indicate that a transaction has been completed.

15. The exchange computer system of claim 1, wherein the series of contracts comprises a series of forward-starting at-the-money forward contracts.

16. The exchange computer system of claim 1, wherein the customized parameters for each option in the series of contracts comprises (i) a strike price equal to an at-the-money price for an underlying asset from the one or more underlying assets, (ii) the corresponding expiry date based on the number of reset periods, and (iii) a corresponding portion of the premium for the cliquet combo based on a time-interpolation of the corresponding expiry for the contract in the series of contracts and the expiry date for the cliquet combo, wherein the at least one hardware processor of the trading engine is configured to perform the time-interpolation.

17. The exchange computer system of claim 1, comprising an order book configured to disseminate information related to assets of the exchange computer system, and wherein the trading engine is configured to list the generated cliquet combo on the order book.

18. An exchange computer system configured to continuously, securely, dynamically, and efficiently generate cliquet options, the exchange computer system comprising:
at least one communication interface that is configured to receive, from one or more remote computing devices connected to the exchange computer system via a computer network, data related to one or more underlying assets;
at least one non-transitory computer-readable medium configured to store the data related to the one or more underlying assets; and
a trading engine comprising at least one hardware processor coupled with the at least one non-transitory computer-readable medium, wherein the at least one non-transitory computer-readable medium is further configured to store computer-executable instructions that when executed by the at least one hardware processor, cause the trading engine to perform processes comprising:
receiving, from a remote user computing device, data related to a request to generate a cliquet option, wherein the cliquet option comprises a series of options, wherein the remote user computing device is configured to display data related to the cliquet option within a graphical user interface of an application that real-time trading, through the exchange computer system, of financial instruments underlying assets including cliquet options, and wherein the remote user computing device is further configured to receive, through the graphical user interface, one or more user inputs that determine the data related to the request to generate the cliquet option;
determining, based on the data related to the request to generate the cliquet option, a number of reset periods for the series of options and an expiry date for the cliquet option, wherein the at least one hardware processor of the trading engine is configured to provide control data comprising signals representing the number of reset periods for the series of contracts in the cliquet option, each signal corresponding option the respective expiry date for each contract in the series of contracts of the cliquet combo;
determining, based on the number of reset periods for the series of options and the expiry date for the cliquet option, an expiry date for each option in the series of options;
determining, based on the expiry date for the cliquet option and the data related to the one or more underlying assets, a premium for the cliquet option;
generating the series of contracts for the cliquet option, based on the expiry date for each contract in the series of contracts and the premium for the cliquet option, each option in the series of contracts having customized parameters that include a strike price and the corresponding expiry; and
securely transmitting data related to the generated cliquet option to the remote user computing device, wherein the remote user computing device is connected to the exchange computer system via the computer network and is configured to display the data related to the generated cliquet option within the graphical user interface.

19. The exchange computer system of claim 18, wherein the at least one non-transitory computer-readable medium is further configured to store additional computer-executable instructions that when executed by the at least one hardware processor, cause the trading engine to perform additional processes comprising:
receiving, at the least one communication interface, from the remote user computing device, data related to a request to exercise the generated cliquet option, wherein the remote user computing device is further configured to receive, through the graphical user interface, one or more additional user inputs that determine the data related to the request to exercise the generated cliquet option;
responsive to receiving the data related to the request to exercise the generated cliquet option at the at least one communication interface, determining by the at least one hardware processor, based on the data related to the generated cliquet option, that the option is exercisable;
responsive to determining by the at least one hardware processor that the generated cliquet option is exercisable, facilitating the request to exercise the generated cliquet option; and
responsive to facilitating the request to exercise the generated cliquet option, sending data to the remote user computing device that causes the graphical user interface to indicate that the generated cliquet option has been exercised.

20. The exchange computer system of claim 18, wherein the series of options comprises a series of forward-starting at-the-money options.

\* \* \* \* \*

UNITED STATES PATENT AND TRADEMARK OFFICE
CERTIFICATE OF CORRECTION

PATENT NO. : 12,165,203 B1
APPLICATION NO. : 18/155548
DATED : December 10, 2024
INVENTOR(S) : Florian Huchedé

Page 1 of 1

It is certified that error appears in the above-identified patent and that said Letters Patent is hereby corrected as shown below:

In the Claims

Column 31, Line 67, Claim 18, please delete "that" and insert -- that facilitates continuous -- and;

Column 32, Line 1, Claim 18, please delete "of financial instruments" and insert -- of -- and;

Column 32, Line 16, Claim 18, please delete "option" and insert -- to -- and;

Column 32, Line 17, Claim 18, please delete "combo" and insert -- option --.

Signed and Sealed this
Twenty-fifth Day of February, 2025

Coke Morgan Stewart
*Acting Director of the United States Patent and Trademark Office*